June 22, 1943.  H. DAVIDSON  2,322,423
SEWER CLEANER
Filed March 12, 1941
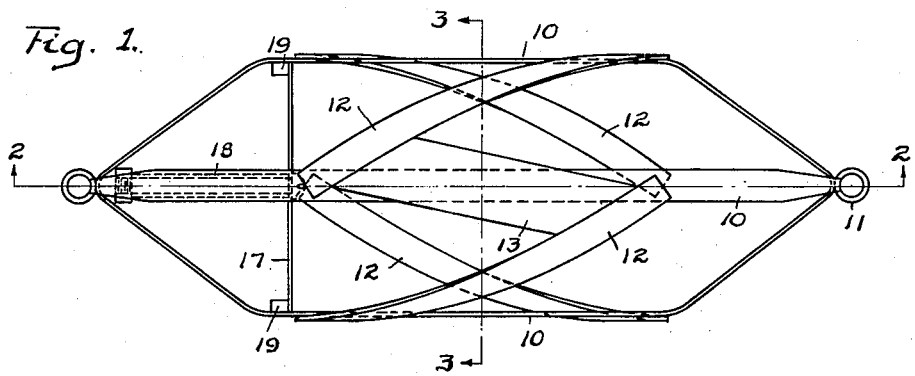
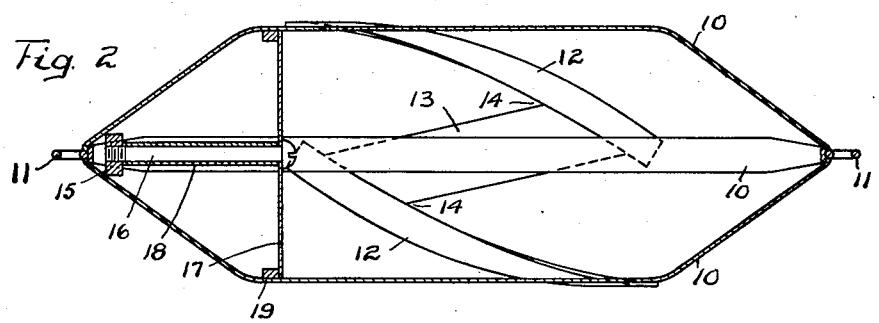
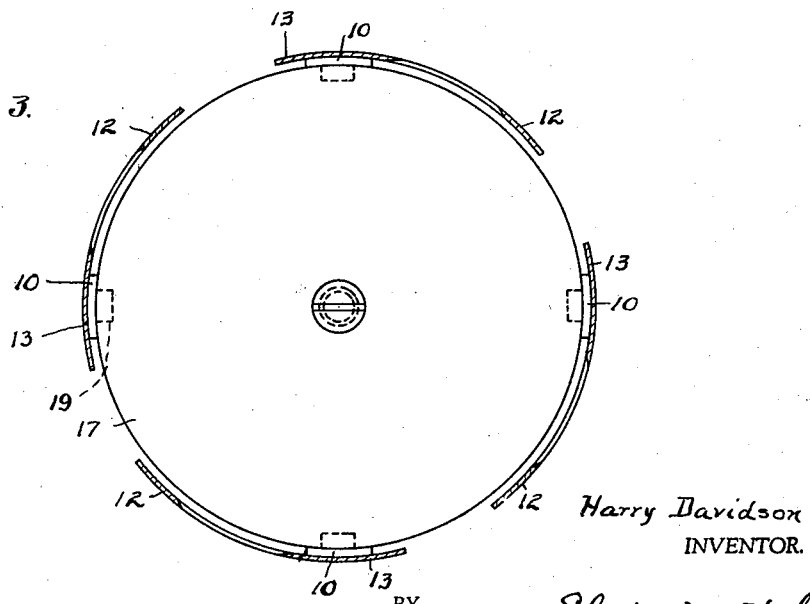
Harry Davidson
INVENTOR.
BY
Attorney.

Patented June 22, 1943

2,322,423

UNITED STATES PATENT OFFICE 2,322,423

SEWER CLEANER

Harry Davidson, Auburn, Ind.

Application March 12, 1941, Serial No. 382,971

1 Claim. (Cl. 15—104.30)

The invention relates to sewer cleaning devices.

In cleaning sewers the most troublesome obstructions encountered are roots which generally enter the tiles at the joints. It is necessary to remove the roots by cutting them off, and to assure a clean conduit the roots should be cut off flush with the inner surface of the tile so that they are completely removed and all obstructions eliminated.

In prior devices for removing roots knives are mounted to sever the roots as the device is drawn through the sewer but the difficulty has been that the knives are so mounted that they do not cut the roots flush with the inner wall of the tile and in many cases merely bend a large percentage of the medium and smaller roots against the wall without cutting them off. This is due to the clearance of the knives with respect to the wall.

The object of my invention is to provide a cleaning device in which the knives are so mounted that they substantially contact the inner wall of the conduit and hence sever all roots flush with the said wall and definitely remove the obstructions as the device is drawn through the sewer.

The invention consists of the novel arrangement and combination of parts hereinafter described and set forth in the claims, an exemplification of the invention being illustrated in the accompanying drawing in which Figure 1 is a side elevation of a device embodying the invention.

Fig. 2 is a cross-section on line 2—2 of Fig. 1, and

Fig. 3 is an enlarged cross-section on line 3—3 of Fig. 1.

Referring to the illustrative drawing, the frame of the device in its present embodiment, is formed of four preferably transversely flat bars or ribs 10. The central portions of the bars are concentric with the longitudinal axis of the frame and are equally spaced circumferentially so that they are disposed on the surface of a cylinder of selected diameter. The bars at each end of the frame slope toward each other and are secured together at their extremities. A ring 11 is secured to each end of the frame for the attachment of a cable by which the device may be drawn through a sewer conduit in either direction.

The root cutting members consist of the rigid blades 12. Each blade is curved longitudinally and is sharpened on its opposite edges. It is secured to the outer face of the opposite ends of the central portion of two adjacent bars 10, so that it is diagonally disposed on the bars and forms the arc of a helix lying upon a cylinder which includes the outer faces of the bars. As shown, each bar 10 supports one end of one blade and also the opposite end of the adjacent blade, so that a spiral effect is produced with the edges of the blades together forming a true circle transversely. A relatively wide cutting blade 13 is diagonally disposed on each bar 10 and is secured at its opposite ends to the blades 12 that are secured to said bar. The blades 13 reinforce the blades 12 and as their cutting edges form acute angles 14 with the companion blades 12, severing of roots that pass into said angles is assured.

The device will be formed to fit within a determined size of tile or sewer conduit and since the diagonal blades are external of their supporting frame they contact the inner wall of the conduit as the device is drawn through the sewer. Any root that projects into the sewer will be cut or sliced off flush with the wall of the conduit, and bending back of any root is avoided. At the same time the moving contact of the flat blades with the conduit tends to sharpen the cutting edges of the blades.

In order to remove sand and other loose obstructions from the sewer I form an internally threaded boss 15 at one end of the frame for the reception of a bolt 16 which is extended through a disc 17 and spacing sleeve 18. The disc bears against the lugs 19 formed on the bars 10 and is therefore rigidly supported in the frame. It is readily removed when not needed.

What I claim is:

A sewer cleaning device comprising a frame formed of a series of longitudinal bars equally spaced on the circumference of a cylinder of selected diameter, said bars converging at their ends to a point incident to the longitudinal axis of the frame and secured together on said axial line to form a stiff inflexible frame, a series of rigid flat diagonally disposed cutting blades on the outer faces of the bars, each blade forming the arc of a helix and adapted to contact over the entire length thereof the inner wall of a sewer conduit, each of said blades having opposite ends thereof rigidly secured to a pair of adjacent longitudinal bars at the points of juncture of said bars with the converging ends thereof, and a relatively wide cutting blade diagonally disposed with respect to each longitudinal frame bar with opposite ends thereof secured to adjacent ends of the cutting blades secured to the bar adjacent the relatively wide cutting blade, said relatively wide cutting blade and associated diagonally disposed cutting blades forming acute angled adjacent cutting edges.

HARRY DAVIDSON.